3,307,975
METHOD OF FRACTIONATING STARCH
Matthias Schmidt, Rudolf Brandes-Alee 93, Bad
Salzuflen, Nordrhein-Westfalen, Germany
No Drawing. Filed June 30, 1965, Ser. No. 468,616
Claims priority, application Germany, Feb. 12, 1962,
H 44,850
7 Claims. (Cl. 127—71)

This application is a continuation-in-part of copending application, Serial No. 255,655, filed February 1, 1963, now abandoned, entitled "Method of Fractionating Starch."

There have already been various proposals for splitting starch into amylose (A-fraction) and amylopectin (B-fraction). Inter alia, the attempt has been made to extract swelling starch with water. Only very dilute solutions (about 1%) can be used in these conditions, and this is uneconomic. At a higher concentration a paste forms and makes separation of the starch fractions impossible. The following have also been proposed for starch fractionation: retrogradation, electrophoresis, enzymic decomposition, selective crystallization with ethanol or pyridine, and the complex formation of amylose with polar organic substances. In practice, however, these methods have either proved impossible to perform or uneconomic, and this applies to the latter process because, inter alia, a supercentrifuge has to be used.

Finally, it has been proposed to fractionate starch by means of concentrated aqueous solutions of an inorganic salt, the starch being heated with the salt solution to 120–160° C. under pressure. Although this method enables higher starch concentrations to be used, so that the economy is improved to that extent, a disadvantage is the risk of hydrolytic decomposition of the starch and discoloration or browning of the product due to the high reaction temperature.

Contrary to the previous proposals, the present invention consists in that an aqueous starch solution of high concentration, advantageously about 7–9% starch (with respect to dry substance) is produced in the cold state in the first instance from the starch to be fractionated, and the solution is then heated to a temperature of below approximately 100° C., and the resultant starch gel is split by means of a dispersing device, later described, the reaction product is then cooled and the amylose separates in the form of balls. The amylose may be separated from the liquid phase containing the amylopectin, for example, by centrifuging, filtration, or the like.

Cooling of the reaction mixture after heating to 85° C. can be carried out with the mixture motionless.

The method according to the invention enables starch to be fractionated into amylose and amylopectin for very low production costs. The product is of an excellent quality unattainable with any of the known methods.

It may be advantageous to add chemicals during the production process according to the invention so as to change the properties of the starch components or influence the viscosity of the solution. The additions do not form complex compounds, however, such as alcohol, nor do they result in or accelerate the precipitation of the amylose.

According to a further feature of the invention, the reaction product resulting from the treatment with the dispersing device, later described, may be kept in motion, for example by agitation. This gives solutions which do not subsequently thicken and in which the amylose also separates in ball form, the size of the balls being dependent upon the intensity of the movement.

An object of the invention is a method for separating starch into its A- and B-fractions by subjecting the starch gel to shear forces of sufficient intensity to decompose the starch.

The method according to the invention relates not only to untreated starch, but also to chemically treated starches and metallic starches.

*Examples*

(1) 800–1,000 ml. of water of a temperature of 100° C. are added to a thin starch paste which is heated to hand heat and which consists of 100 ml. of water and 100 g. of potato starch with the conventional moisture content of 20%, the mixture being treated in a high-speed dispersing device. It is then heated until the temperature has again risen to about 85° C. The disperser is then stopped. After cooling of the reaction mixture at rest, the amylose is centrifuged off, washed out with water and either dried or processed further. The amylopectin filtrate is either advantageously concentrated in vacuo, obtained as a dry powder, or subjected to further processing.

(2) A thin starch paste consisting of 900–1100 ml. of water and 100 g. of potato starch (with the conventional moisture content of 20%) is heated to approximately 85° C. with treatment by means of a high-speed dispersing device. The period of action as from the point at which the paste clogs (60–80° C.) until the end of the reaction is about 5 minutes. The process is complete as soon as the structure of the swollen starch grains can no longer be recognized under the microscope and the starch solution becomes thinly fluid.

Instead of potato starch, calcium starch (having a moisture content of 20%) may be used in the same quantity.

Before treatment in accordance with the examples the starch may be mixed with acrolein and be heated in a closed vessel.

In some cases it may be advantageous to add a small quantity of urea and/or formalin to the thin starch paste.

By dispersing devices are meant such mechanical high-frequency dispersing apparatus as the two devices known under the trademarks Supraton and Ultra-Turrax. Suitable dispersing devices of this kind are described in the United States Patents 2,619,330 and 2,789,800, issued to Peter Willems. As stated in #2,619,330, these devices operate so that "the revolving teeth seize the mixture and fling it against the teeth which are fixed or which rotate in opposite direction and press it through the small slits between these teeth, smashing it up. The passing of mixture through the small slits at a high velocity and under high force causes a high pressure at the entrance into the slits and a low pressure at the exit end of the slits. At very high rotation speed the frequency of the said difference of pressure reaches the efficiency of ultra-sound oscillations and causes together with the frequent violent impacts upon the mixture the disintegration of the particles.

However, it is expressly to be understood that the method of the invention can be practiced using any high-frequency mechanical dispersing device that establishes shear forces of sufficient magnitude in the liquid, so as to separate the starch into its fractions.

Although other factors may enter into and promote the fractionation of starch, in accordance with the invention—such as the production of sound waves and pressure waves within the starch solution—it is the shear forces that are the fundamental cause of the separation of the starch.

The speed at which the disperser is operated depends on the diameter of the disperser. If the diameter of the disperser is 45 millimeters, the maximum operating speed is 10,000 revolutions per minute. If the diameter is 115 to 150 millimeters, the speed is 2,900 r.p.m.

If the operating speed falls below a certain minimum value, which depends upon the diameter of the disperser, the starch will fail to fractionate. Once the minimum speed is reached, any further increase in the speed will cause a more rapid fractionation.

The degree and speed of separation is dependent on the speed of operation of the disperser. The speed of separation is also dependent, very slightly on the initial viscosity of the solution.

When practicing the method of the invention, the original viscous starch solution slowly becomes thinner. Its temperature, because of friction heat, rises; and the separation of the starch into its components, on the one hand, and the higher temperature, on the other hand, lower the viscosity.

I claim:

1. A process of fractionating starch for the production of amylose and amylopectin, comprising
   preparing an aqueous solution of starch at normal temperature;
   heating the solution to a temperature less than approximately 100° C. while subjecting the formed starch gel to substantial shear forces in a generally cylindrical dispersing device rotating at a high speed corresponding to 2900–10,000 r.p.m. for a disperser having a diameter of 150–45 mm. so as to decompose the starch gel into amylose and amylopectin, said speed of rotation being selected on the basis of the diameter of the dispersing device;
   cooling the decomposed gel;
   and separating the fluid amylopectin from the deposited amylose.

2. The process of claim 1, wherein the gel is cooled without agitation.

3. The process of claim 1, wherein the gel is cooled with agitation.

4. The process of claim 1, in which said temperature is about 85° C.

5. The process of claim 1, wherein said starch is chosen from the group consisting of potato starch and calcium starch.

6. The process of claim 5, wherein said aqueous solution contains about 7–9% starch (calculated on dry matter).

7. The process of claim 6, in which said temperature is about 85° C.

References Cited by the Examiner

UNITED STATES PATENTS

| | | | |
|---|---|---|---|
| 2,515,095 | 7/1950 | Schoch | 127—71 |
| 2,619,330 | 11/1952 | Willems | 259—96 |
| 2,789,800 | 4/1957 | Willems | 259—135 |
| 3,067,067 | 12/1962 | Etheridge et al. | 127—71 |
| 3,137,592 | 6/1964 | Protzman et al. | 127—28 |

MORRIS O. WOLK, *Primary Examiner.*

E. G. WHITBY, *Assistant Examiner.*